(12) United States Patent
Carpenter et al.

(10) Patent No.: US 7,333,709 B2
(45) Date of Patent: Feb. 19, 2008

(54) SPLICE HOLDER DEVICE

(75) Inventors: James B. Carpenter, Austin, TX (US); Douglas P. Hills, Cedar Park, TX (US); Chansool Park, Seoul (KR); Donald K. Larson, Cedar Park, TX (US); Paul N. Winberg, Rollingwood, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 148 days.

(21) Appl. No.: 11/221,527

(22) Filed: Sep. 8, 2005

(65) Prior Publication Data

US 2006/0067637 A1 Mar. 30, 2006

Related U.S. Application Data (60) Provisional application No. 60/691,881, filed on Jun. 17, 2005, provisional application No. 60/613,169, filed on Sep. 24, 2004.

(51) Int. Cl.
*G02B 6/00* (2006.01)

(52) U.S. Cl. .................. 385/136; 385/134; 385/95; 385/99; 385/135; 385/137

(58) Field of Classification Search ............. 385/134, 385/135, 137, 94, 99
See application file for complete search history.

(56) References Cited

U.S. PATENT DOCUMENTS

| 4,629,284 A | 12/1986 | Malavielle |
| 4,753,509 A | 6/1988 | Parstorfer |
| 4,818,055 A | 4/1989 | Patterson |
| 4,824,197 A | 4/1989 | Patterson |
| 4,854,661 A | 8/1989 | Cooper et al. |
| 4,911,662 A | 3/1990 | Debortoli et al. |
| 5,052,773 A | 10/1991 | Bossard et al. |
| 5,074,635 A | 12/1991 | Justice et al. |
| 5,097,529 A | 3/1992 | Cobb et al. |
| 5,102,212 A | 4/1992 | Patterson |
| 5,138,681 A | 8/1992 | Larson et al. |

(Continued)

FOREIGN PATENT DOCUMENTS

DE 44 06 154 A1 3/1995

(Continued)

OTHER PUBLICATIONS

"UCAO Splice Enclosure", Product Specification; Corning Cable Systems LLC, Hickory, NC (Dec. 2002).

(Continued)

*Primary Examiner*—Frank G. Font
*Assistant Examiner*—James P. Hughes
(74) *Attorney, Agent, or Firm*—Gregg H. Rosenblatt (57) ABSTRACT

A splice holder device includes a tray mountable in a telecommunications closure, the tray including a splice mounting mechanism configured to receive a splice device. The splice holder device also includes first and second fiber clamps disposed on the tray, wherein the first and second fiber clamps are each configured to releasably secure a buffered portion of an optical fiber. The tray can include a single splice device, such as a mechanical splice, mounted therein or can include a plurality of splice devices mounted therein. The splice holder device can be configured to be securedly mounted in a telecommunications enclosure.

27 Claims, 9 Drawing Sheets

U.S. PATENT DOCUMENTS

| | | |
|---|---|---|
| 5,151,964 A | 9/1992 | Carpenter et al. |
| 5,155,787 A | 10/1992 | Carpenter et al. |
| 5,155,794 A | 10/1992 | Nolf et al. |
| 5,159,653 A | 10/1992 | Carpenter et al. |
| 5,222,183 A | 6/1993 | Daems et al. |
| 5,414,790 A | 5/1995 | Lee et al. |
| 5,590,234 A | 12/1996 | Pulido |
| 5,638,477 A | 6/1997 | Patterson et al. |
| 5,734,775 A | 3/1998 | Vidacovich et al. |
| 5,862,289 A | 1/1999 | Walter et al. |
| 5,870,519 A | 2/1999 | Jenkins et al. |
| 6,195,496 B1 | 2/2001 | Daoud |
| 6,240,236 B1 | 5/2001 | Daoud |
| 6,249,636 B1 | 6/2001 | Daoud |
| 6,259,851 B1 | 7/2001 | Daoud |
| 6,285,815 B1 | 9/2001 | Daoud |
| 6,512,876 B2 | 1/2003 | Daoud |
| 2004/0258370 A1* | 12/2004 | Bush et al. .................. 385/97 |
| 2005/0276562 A1 | 12/2005 | Battey et al. |
| 2006/0072884 A1* | 4/2006 | Yamauchi et al. ............ 385/98 |
| 2006/0153515 A1* | 7/2006 | Honma et al. .............. 385/134 |
| 2006/0165352 A1 | 7/2006 | Caveney et al. |
| 2006/0280417 A1* | 12/2006 | Sato et al. .................. 385/134 |

FOREIGN PATENT DOCUMENTS

| | | |
|---|---|---|
| EP | 0 290 188 A2 | 11/1988 |
| EP | 0 413 548 A2 | 8/1990 |
| WO | WO 90/05318 | 5/1990 |
| WO | WO 96/38752 | 12/1996 |
| WO | WO 00/65397 | 11/2000 |

OTHER PUBLICATIONS

U.S. Appl. No. 10/873,879, entitled "Fiber Splicing and Gripping Device", filed Jun. 22, 2004.

U.S. Appl. No. 10/916,332, entitled "Telecommunications Cable Enclosure", filed Aug. 11, 2004.

* cited by examiner

SPLICE HOLDER DEVICE

RELATED APPLICATIONS

The present application claims the benefit of priority of U.S. Provisional Patent Application Nos. 60/613,169 (filed Sep. 24, 2004) and 60/691,881 (filed Jun. 17, 2005), both of which are incorporated by reference herein in their entirety.

BACKGROUND OF THE INVENTION

1. Field of the Invention

The present invention is directed to a splice holder device for telecommunication terminals and closures.

2. Related Art

Telecommunication cables are used for distributing data across vast networks. The majority of telecommunication cables are electrically conductive cables (typically copper), although the use of optical fiber cables is growing rapidly as larger and larger amounts of data are transmitted. As telecommunication cables are routed across networks, it is necessary to periodically open the cable and splice or tap into the cable so that data may be distributed to "branches" of the network. The branches may be further distributed until the network reaches individual homes, businesses, offices, and so on. The distributed lines are often referred to as drop lines. At each point where the cable is opened, it is necessary to provide some type of enclosure to protect the cable and allow easy and repeated access to the cable, such that technicians may easily access the cable to provide necessary services.

Enclosures for both electrical and optical telecommunication cables are generally known. For example, there are enclosures that receive one or more cables and contain some form of cable connection. Such enclosures often also contain storage means for storing unused conductive wires or optical fibers waiting for subsequent use. In some enclosures, splices in the cable and connection devices intended for subsequent connection to drop wires are maintained in separate areas of the enclosure, so as to reduce the possibility of damaging or disrupting cable splices during re-entry into the enclosure when connecting drop lines or the like.

Conventional enclosures are typically intended for use with electrically conductive telecommunications cables, and are not generally suitable for use with fiber optic cables, which have different constructions and performance concerns than electrically conductive cables. For example, optical fibers and their connections are more sensitive to their physical handling and the presence of debris such as dust, moisture, and the like. In addition, splicing optical fibers requires expertise and structures not required for electrical connections. Example optical fiber splicing structures are described in, e.g., U.S. Pat. No. 5,052,775 and U.S. Pat. No. 5,638,477.

SUMMARY OF THE INVENTION

According to a first aspect, a splice holder device comprises a tray mountable in a telecommunications closure, the tray including a splice mounting mechanism configured to receive a splice device. The splice holder device also includes first and second fiber clamps disposed on the tray, where the first and second fiber clamps are each configured to releasably secure a buffered portion of an optical fiber. In one aspect, the tray includes a plurality of splice mounting mechanisms configured to receive a plurality of splice devices. The splice holder device can be configured to be securedly mounted in a telecommunications enclosure.

In another aspect, the splice mounting mechanism includes a plurality of retaining arms to releasably secure the splice device. The plurality of retaining arms can be integrally formed on a surface of the tray and can include a latch portion that engages with a top surface of the splice mounted therein. The mounting mechanism can further include one or more position stops configured to reduce an axial movement of the splice device secured in the splice mounting mechanism. The tray, splice mounting mechanism, and fiber clamps can be integrally formed as a single piece of material.

In another aspect, one or more alignment structures can be integrally formed on a surface of the tray and disposed at one or more of the first and second ends of the tray.

In yet another aspect, the splice holder device further comprises a splice actuation mechanism coupled to a receptacle formed in the tray and configured to actuate a splice device mounted in the splice mounting mechanism. The splice actuation mechanism can comprise a lever removably coupled to the tray and a driver formed on an end of the lever and adapted to contact a portion of the splice device. The splice actuation mechanism can further comprise a column coupled to the lever to resist a movement of the lever in at least one direction.

In another alternative aspect, the splice actuation mechanism comprises one or more splice actuator lever arms mounted to posts formed on the tray and a splice cap driver configured to contact a portion of a splice device mounted in the splice mounting mechanism.

In one aspect, at least one of the first and second fiber clamps comprises a base portion and a clamping plate portion separated by a living hinge. In another aspect, at least one of the first and second fiber clamps comprises a base portion having an alignment groove formed therein, where the alignment groove is configured to support a portion of the optical fiber disposed therein, and an engagement portion configured to rotatably engage a clamp plate. At least one of the base and the clamp plate can comprise a latch to secure the fiber clamp in a closed position about an optical fiber disposed therein. In yet another aspect, at least one of the first and second fiber clamps comprises a base platform axially moveable on the tray and having an adjustable height with respect to the tray. The base platform can include one or more members extending therefrom and configured to be received in one or more slots formed in the tray. A first portion of the one or more members can have a first thickness and a second portion of the one or more members can have a second thickness, where the first thickness is greater than the second thickness. The base platform can include an alignment groove formed therein, where the alignment groove is configured to support a portion of the optical fiber disposed therein, and an engagement portion configured to rotatably engage a clamp plate.

In yet another embodiment, at least one of the first and second fiber clamps comprises a base rotatably engageable with a boss formed on a surface of the tray near one of the first and second ends. The base can further comprise a first set of detents formed in a radial pattern and configured to engage a second set of detents formed on a surface of the tray near one of the first and second ends.

In yet another aspect, at least one of the first and second fiber clamps comprises a fiber support block having a slit formed therein configured to retain the buffered portion of an optical fiber received therein.

The above summary of the present invention is not intended to describe each illustrated embodiment or every implementation of the present invention. The figures and the detailed description which follow more particularly exemplify these embodiments.

BRIEF DESCRIPTION OF THE DRAWINGS

The present invention will be further described with reference to the accompanying drawings, wherein.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION OF THE EMBODIMENTS

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Embodiments of the present invention are directed to a splice holder device for telecommunication terminals and closures. The exemplary splice holder device described herein can be readily installed and utilized within conventional closures/terminals for Fiber To The Home (FTTH) and/or Fiber To The X (FTTX) network installations. The exemplary devices of the present invention can be utilized in installation environments that require ease of use when handling multiple splices and connections, especially where labor costs are more expensive and/or when there may be a need to reopen the splice device (e.g., to make a repair or service the line). In addition, the exemplary devices of the present invention provide torsion and strain relief for both the distribution and drop cable fibers. Furthermore, splicing to distribution cables can be accomplished without the need for additional splicing tools.

Figure 1A:
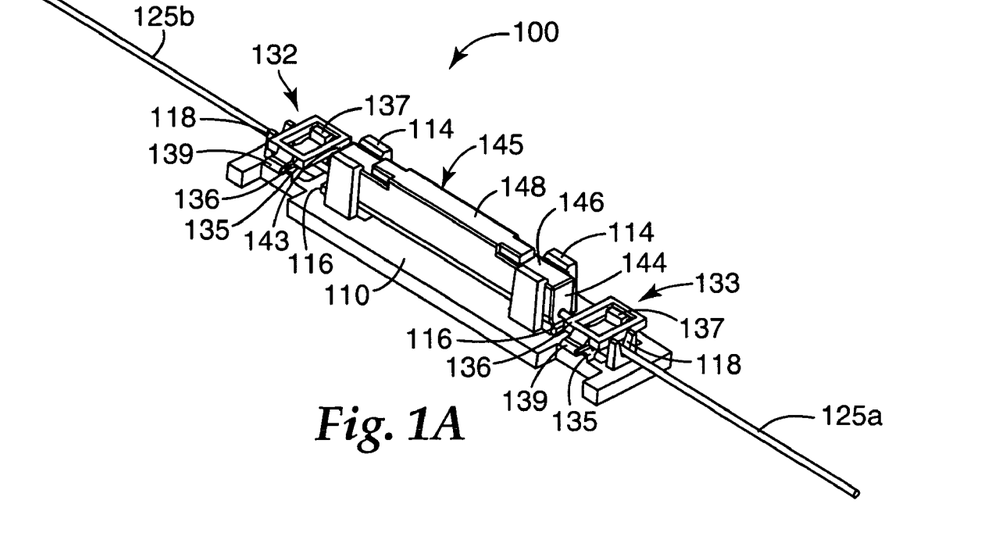
FIGS. 1A and 1B show isometric views of a splice holder device according to an embodiment of the present invention.
Figure 1B:
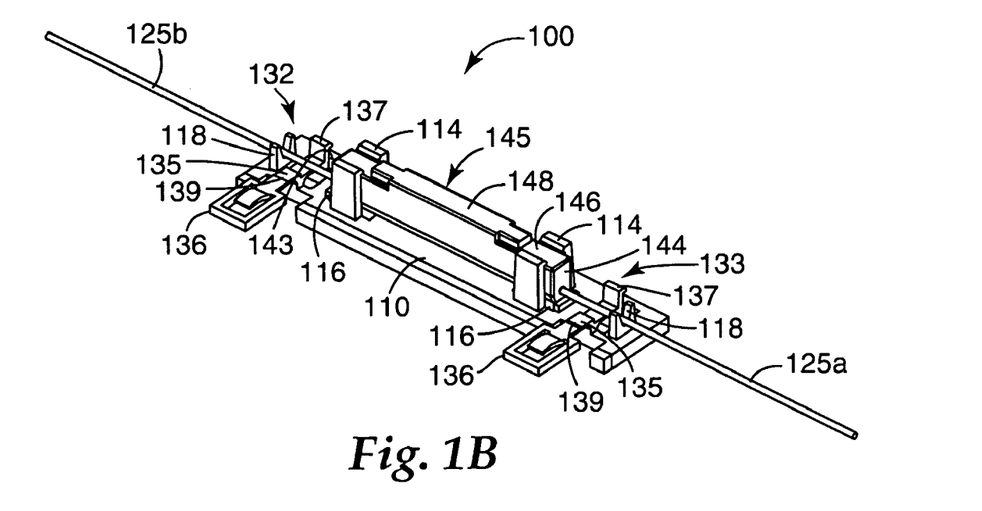

FIGS. 1A and 1B show a first exemplary embodiment of the present invention, a splice holder device 100 for telecommunication terminals and closures. In this exemplary aspect, the components of the splice holder device 100 can be integrally formed as a single device, while the splice element (described below), is provided as a separate element.

An exemplary terminal or closure (also referred to as an enclosure) can be manufactured from an appropriate rugged material to protect the splices supported within from damaging interference due to weather elements, dust, animals, and other elements. Further, the enclosure can be designed to permit re-entry by an installer. An exemplary enclosure can be a below-grade enclosure, an above-grade (i.e., above-ground) enclosure, and/or can be further adapted to be suspended from a support cable (not shown) by, e.g., means of at least one hanger.

The device 100 includes a tray or platform 110 that is installable in a telecommunications terminal or enclosure. Installation can be performed by using an adhesive, such as a double-sided tape with a release liner, to attach the splice holder device 100 to an interior or exterior portion of the telecommunications terminal or enclosure. An exemplary tape is a 3M 4930 general purpose VHB tape, available from 3M Company, St. Paul (Minn.), which is used to secure plastic surfaces to other plastic and metal surfaces for extended periods of time (e.g., years) in a variety of environments. Alternatively, other adhesives, such as glue, epoxies, etc., can be used, or the tray 110 can be mounted to a telecommunications terminal or closure structure via a fastening article, such as a screw or bolt. In a further alternative, a telecommunications terminal or enclosure can include a port or structure (not shown) that is configured to secure the device 100 to an interior or exterior portion thereof, such as through the use of a latching mechanism, snap-in feature or a coupling receptacle.

As shown in FIGS. 1A and 1B, the tray can hold a single spice device, such as a mechanical splice. For example, device 100 is configured to hold a splice device 145. Alternatively, tray 110 can be configured to hold more than one splice, either serially, in parallel, or in an alternating arrangement. For purposes of simplicity, the exemplary embodiments shown in the figures display a single splice device held in the splice holder device embodiments.

The tray 110, and/or components formed thereon, can be constructed from a standard material, such as metal or plastic. Preferably, the tray is constructed from a molded plastic material, e.g., a suitable polymer material, such as polycarbonate, polyamide, polypropylene, polyethylene or the like. In an exemplary embodiment, especially for an environment subject to varying temperatures, tray 110 is constructed from a material having the same or similar coefficient of thermal expansion as the material used to construct splice device 145. For example, tray 110 and the body of splice device 145 can both be constructed from a liquid crystal polymer, such as VECTRA, available from Ticona, of Florence, Ky.

In an exemplary embodiment, splice device 145 comprises a mechanical splice device, such as a 3M™ FIBRLOK™ I mechanical fiber optic splice, a 3M™ FIBRLOK™ II mechanical fiber optic splice or a multifiber 3M™ FIBRLOK™ mechanical fiber optic splice, available from 3M Company, of St. Paul, Minn.

For example, commonly owned U.S. Pat. No. 5,159,653, incorporated herein by reference in its entirety, describes an optical fiber splice device (similar to the FIBRLOK™ II mechanical fiber optic splice device) that includes a splice element that comprises a sheet of ductile material having a focus hinge that couples two legs, where each of the legs includes a V-type (or similar) groove to optimize clamping forces for conventional glass optical fibers received therein. In addition, a conventional index matching fluid can be preloaded into the V-groove region of the splice element for improved optical connectivity within the splice element. Other conventional mechanical splice devices can also be utilized in accordance with alternative aspects of the present invention and are described in U.S. Pat. Nos. 4,824,197; 5,102,212; 5,138,681; and 5,155,787, each of which is incorporated by reference herein, in their entirety. The term "splice," as utilized herein, should not be construed in a limiting sense since element 145 can allow removal of a fiber.

In an exemplary embodiment, utilizing a FIBRLOK™ II mechanical fiber optic splice device, splice device 145 can include a splice connector body 146 and a cap 148. In operation, as the cap 148 is moved from an open position to a closed position (e.g. downward in the embodiment depicted in FIGS. 1A and 1B), two cam bars located on an interior portion of the cap can slide over splice element legs (not shown), urging them toward one another (see e.g., U.S. patent application Ser. No. 10/873,879, incorporated by reference herein in its entirety). Two fiber ends, such as the terminal ends of fibers 125a and 125b, are held in place in grooves formed in the splice element and butted against each other, and are spliced together to provide sufficient optical connection, as the element legs are moved toward one another.

In order to secure splice device 145, splice holder device 100 further includes a splice mounting mechanism, such as splice retainer arms 114. In an exemplary aspect, splice retainer arms 114 are integrally formed (e.g., by molding) on tray 110. One or more of the retainer arms can include a finger or latch (see FIG. 3, latch 214a) to engage a surface of the splice (such as a surface of body 146 shown in FIG. 1A). As with the tray 110, the splice mounting mechanism can be formed from a material such as metal or plastic. The mounting mechanism is configured (through e.g., snug or snap-fit, such as by having engaging portions (e.g. latch 214a shown in FIG. 3) that engage the body of the splice when the spice is seated within the mounting mechanism) to secure the axial and/or lateral position and/or height position of the splice device 145. In addition, position stops 116 can be provided on tray 110 to further prevent axial movement of the splice along the tray. By "axial" it is meant along the axis of a fiber being spliced. The securing of the splice 145 is not permanent, as splice 145 can be removed from retaining arms 114 by the application of modest force. In an alternative embodiment, the splice 145 can be secured through a cradle-type mounting device (see e.g., U.S. Provisional Patent Application No. 60/613,169, incorporated by reference herein in its entirety). In a further alternative, the splice 145 can be secured to the tray 110 with another clamp type mounting device that is molded into the tray, and that allows removal of the splice if so desired. The mounting device can hold the splice device such that the splice device cannot be easily rotated, or easily moved forward or backward or upward or downward once installed.

The splice 145 is used to splice together two optical fibers through butt-coupling the terminal ends of the fibers. In this exemplary embodiment, fibers 125a and 125b can comprise standard single mode or multimode optical fiber, such as SMF 28 (available from Corning, Inc., Corning, N.Y.), which are used as drop cables or distribution cables. In an exemplary embodiment, the fibers 125a and 125b each have a 900 μm outer diameter buffered cladding (not including standard fiber jacketing), although fibers 125a and 125b can comprise any standard optical fiber buffered diameter, such as 250 μm, or fiber buffered diameters larger or smaller. As shown in FIGS. 1A and 1B, in an exemplary embodiment, the fiber ends can be installed into splice ports 143 and 144 of a splice device 145.

In addition, splice holder device 100 further includes fiber clamps 132 and 133. In an exemplary embodiment of the one piece splice holder 100 shown in FIGS. 1A and 1B, fiber clamps 132 and 133 are integrally formed on tray 110. According to other embodiments, fiber clamps can be provided separately (see e.g., the embodiments of FIGS. 2, 6, 11, 14A and 14B). The fiber clamps 132, 133 can minimize and/or prevent torsion stresses on the fibers 125a,b, which can exist when using 900 μm buffer coated fibers, and can provide strain relief. Further, splice holder device 100 can include one or more fiber guides or grooves 118 to further assist in aligning and/or positioning the fibers being spliced. In an alternative aspect, fiber guides can be formed in position stops 116.

As shown in the example of FIG. 1A, fiber clamps 132, 133 can comprise a clamp mechanism having a base portion 135 (where the buffered fiber is seated). The base portion can include a flat surface (such as shown in FIG. 1B) or a grooved surface (such as groove 261 shown in base portion 235 in FIG. 3) that is axially aligned with the entry port of the mechanical splice.

In addition, fiber clamps 132, 133 can comprise a clamp plate portion 136 to clamp the fiber between the clamp plate portion 136 and the base portion 135. A living hinge 139, such as a section of thinner material disposed between the clamp plate and base, can be provided to allow rotatable clamp movement between an open position (such as shown in FIG. 1B) and a closed position (such as shown in FIG. 1A). The clamp plate 136 can be releasably secured in a closed position using, e.g., a latch mechanism 137. In other embodiments, fiber clamps 132, 133 can comprise different structures (see e.g., FIGS. 2, 6, 11, 14A and 14B). Alternatively, fiber clamps 132 and 133 can comprise a well that will accept an adhesive to secure the fiber 125. The clamp 132 can thus provide proper fiber location and orientation, (if orientation is required), for mechanical splicing.

In a further alternative, fiber clamp 132 (or 133) can have a different structure (see e.g., the fiber clamp structures shown in FIGS. 2, 6, 11, 14A and 14B) from fiber clamp 133 (or 132).

Further embodiments of fiber clamps are described herein. In addition, alternative constructions of the fiber clamp can include a collet construction or a pinch clamp construction, such as a butterfly type pinch clamp. The fiber clamp can also be constructed as a Crimplok™ type element to retain the buffer to the holder. A further alternative includes an elliptical tube molded in the end of the holder and deformed into a round shape to receive the fiber, then relaxed back into the elliptical shape to retain the fiber.

Restricting the ability of a spliced fiber to rotate can be an important factor to optical network providers. When splices are made in the field, the splice is made in one location and transferred to a fiber management storage means, such as a tray, outlet box, terminal, etc. Due to this splice location transfer, additional fiber length is needed to allow the movement of the splice from one location to the other. This additional fiber length is called "slack", and is also used for future maintenance of the optical circuit providing additional fiber length for re-splicing of the optical circuit.

The exemplary embodiments described herein can provide more reliable splices in a network environment. For example, during the process of moving a splice from the splicing point to the final location in a tray, the fibers can accumulate rotational twist, as the fiber slack is coiled in the tray or storage unit. This twist of the fiber applies torsion stress to the fiber at the point at which it is retained, in the splice. With reference to a conventional 900 µm outer diameter fiber having a 125 µm glass clad/core, there is a fiber section inside the splice where the buffer coating has been removed exposing bare 125 µm diameter glass. The splice aligns the glass portions of the fiber in a secure manner inside the splice, not allowing the glass fibers to rotate and relieve the torsion stress that is being applied by the coiled fiber. Depending on the knowledge and skill of the installation technician during the coiling of the fiber slack in the storage means, this torsion stress can be minimal, or extreme.

Torsion stress, which can exceed the mechanical strength of the glass fiber causing the fiber to break, can generally occur at an interface location where the bare glass fiber is "clamped" by the splice and/or where the buffer coating has been stripped. This potential breakage failure can occur quickly or can take years to occur. Thus, the present exemplary embodiments can address the concern of whether the splice was stored in the storage unit properly by the installation technician.

Although not shown in FIGS. 1A and 1B (but as is shown in detail in e.g., FIG. 2), splice holder device 100 can further include a splice actuator mechanism. The splice actuator mechanism can be provided as a separate or integral structure with tray 110.

Figure 2:
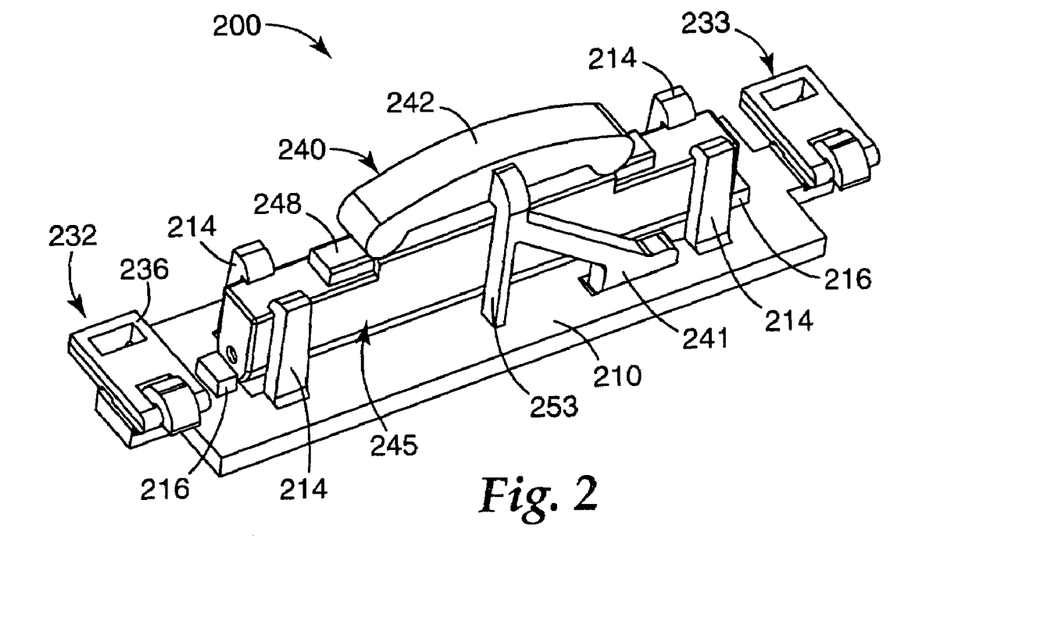
FIG. 2 shows an isometric view of a splice holder device according to another embodiment of the present invention.

In another embodiment, a splice holder device 200 is shown in FIG. 2. Splice holder device 200 includes a tray or platform 210 that is installable in a telecommunications terminal or enclosure, similar to tray 110, shown in FIGS. 1A and 1B, that is configured to secure a splice 245, similar to those splices described above. Retaining arms 214 and position stops 216 of tray 210 are also similar to those like elements described above.

Figure 3:
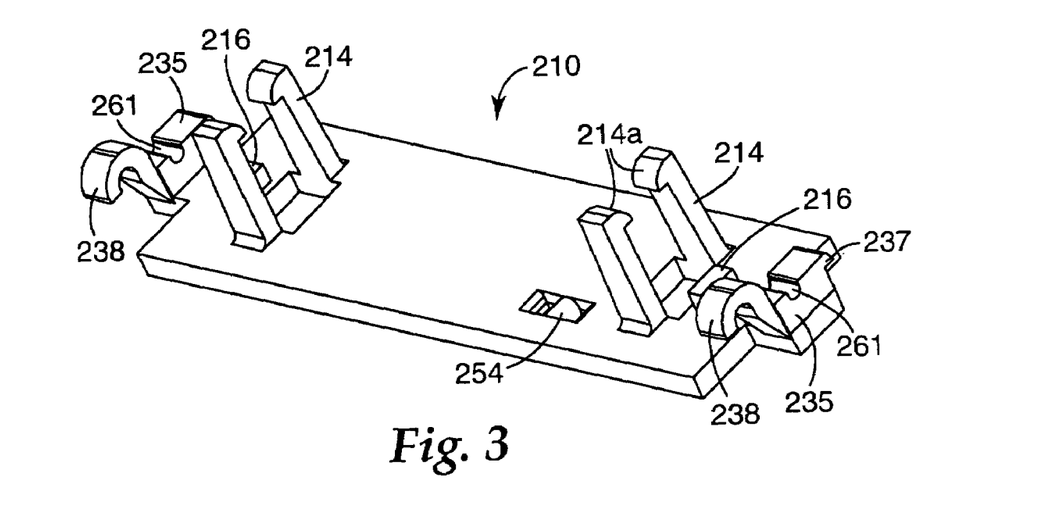
FIG. 3 shows an isometric view of the splice holder tray of FIG. 2.
Figure 4:
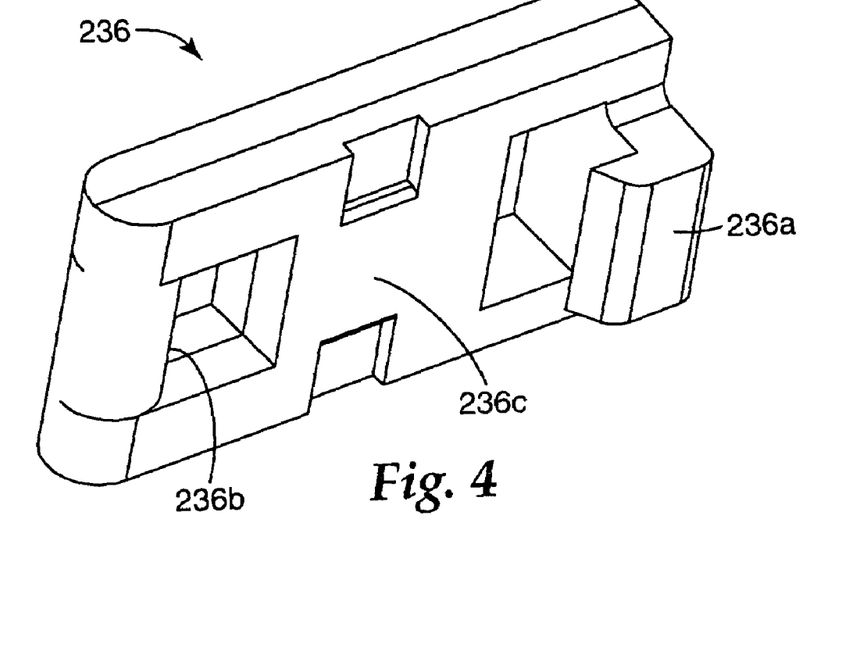
FIG. 4 shows an isometric view of a clamping plate of the splice holder tray of FIG. 2.
Figure 5:
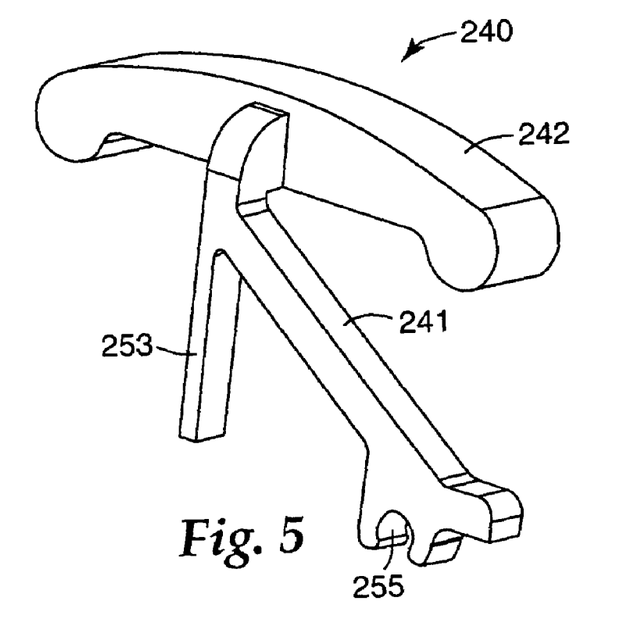
FIG. 5 shows an isometric view of a splice actuation mechanism of the splice holder tray of FIG. 2.

In an exemplary embodiment, as also shown in more detail in FIGS. 3-5, splice holder device 210 is configured to receive a splice actuator mechanism 240 (shown in detail in FIG. 5), which includes a splice actuator lever 241. Splice actuator mechanism 240 can be coupled to tray 210 in a straightforward manner, such as by engaging a lever coupling mechanism 255 (see FIG. 5) to a lever attachment port 254 (shown in FIG. 3) formed in tray 210. Preferably, the splice actuator mechanism 240 is constructed from a molded plastic material, e.g., a suitable polymer material, such as polycarbonate, polyamide, polypropylene, polyethylene or the like. Thus, in an exemplary embodiment, lever 241 can be formed as a separate piece that is coupled to the tray 210 during field splicing or in factory assembly. Having the actuation lever on the holder base allows the installation technician to make the splice in the same location in which it will be permanently stored with out the use of a separate actuator tool.

In addition, splice actuator mechanism 240 can include a splice cap driver 242 that is coupled to the end of lever 241. In operation, when fibers, e.g., fibers 125a and 125b, are inserted into splice device 245 through splice ports, the actuating cap 248 can engage the mechanical splice element through the application of a force against driver 242. Thus, through the application of a modest force (e.g., by an installer depressing the lever/driver mechanism), the splice device 245 can be actuated to complete the splicing of the fibers. Preferably, driver 242 is configured to spread the driving force across a substantial surface area of cap 248 to provide a more uniform actuation.

In addition, splice actuator mechanism 240 can include a pre-actuation safety column 253, such as is shown in FIGS. 2 and 5. The column 253 can be coupled to lever 241 and can be configured to provide some modest resistance to an initial downward motion of the lever/driver, thus helping reduce the likelihood of an accidental actuation of the splice. In one aspect, the column 253 can comprise a thin or pliable material that will bend, break or snap off with a sufficient force when the actuation lever is pushed or pressed to place the splice cap into a fully closed position. When configured as a breakaway material, the presence or absence of a safety column 253 can signal an installer that a splice has/has not been actuated.

Alternatively, the lever/driver mechanism can be constructed as a push button device. These exemplary configurations allow for an installer to splice one or more drop cable fibers to a distribution cable without the need for additional splicing tools as the splice device and actuation mechanism can be integral with tray 110.

Alternatively, lever 241 can be can be configured as a rod that is formed as part of the molded tray 210 that has sufficient pliability to be bent from its normal orientation.

As is shown in FIG. 2, splice holder device 200 can further include fiber clamps 232 and 233. In this exemplary embodiment, the fiber clamps are configured as two-piece devices, where a base 235 is attached to or integrally formed with tray 210 and a clamp plate portion 236 is coupled to the base 235. In this exemplary embodiment, a base arm, member or hook 238 can engage with a rod portion 236b (shown in FIG. 4) of the clamp plate 236. If base arm, or member 238 is in the form of a hook, the radial portion of 238 is preferably greater than 180 degrees so as to capture and retain the rod portion 236b of the clamp plate 236, so that the clamp plate will not become easily disengaged from the base 235 of the splice holder assembly. The opening of base arm or member or hook 238 is preferably as large or larger than the diameter of the rod portion 236b of the clamp plate 236 so as to allow rotation of the clamp plate while being held by the base arm or member or hook. In a closed position, a latch portion 236a of clamp plate 236 engages a latch portion 237 of base 235. Alternatively, the clamp plate can include a hook portion that engages a rod portion of the base.

In addition, base 235 can include a fiber support channel/groove 261 that is configured to receive a particular fiber outer diameter. When placed in the closed position, the fiber is secured between a surface 236c of clamp plate 236 and the fiber support channel or groove 261.

The channel/groove 261 can have a similar size radius to the fiber being spliced, such as a 900 μm buffer coated fiber. The channel/groove 261 can be used to provide a support channel for clamping onto the coating of the fiber. The channel/groove 261 can have the same shape as the fiber to reduce or eliminate optical loss that may be induced due to micro- or macro-bending of the glass fiber inside of the 900 μm buffer coating under clamping stresses. In an alternative embodiment, the support channel/groove 261 can be configured to axially extend from the base toward an entrance port of the splice 245, such that the fiber is continually supported from the fiber clamp base to the splice.

A fiber splicing technique using splice holder 100 or 200 can take place as follows. Fibers are stripped, cleaned, cleaved, or otherwise prepared for splicing. The splice device can be placed in the holder tray. A first fiber can be guided through the fiber clamp and inserted into a first entrance port of the splice device. The stripped fiber is fed through the splice device until the non-stripped portion of the fiber is prevented from further axial movement by the decreasing fiber guide portions of the splicing device. The second fiber is then inserted through the other side of the splice holder and splice until the terminal end of the second fiber meets the terminal end of the first fiber. The splice can be actuated through the use of actuation mechanism 240. The first and second fiber clamps can then be placed into closed positions to clamp the buffer portions of the fibers to restrict the ability of the fibers to rotate, thereby reducing the likelihood of torsional strains and stresses placed on the spliced fibers.

In an alternative actuation technique, the fibers are stripped, cleaned, cleaved, or otherwise prepared for splicing. The splice device can be placed in the holder tray. A first fiber can be guided through the fiber clamp and inserted into a first entrance port of the splice device. The stripped fiber is fed through the splice device until the non-stripped portion of the fiber is prevented from further axial movement by the decreasing fiber guide portions of the splicing device. The first buffer clamp can then be closed to secure the first fiber in place. The second fiber is then inserted through the other side of the splice holder and splice until the terminal end of the second fiber meets the terminal end of the first fiber and a slight bow of the fiber is observed. The splice can be actuated through the use of actuation mechanism 240. The bow can then be released and the second fiber clamp can then be placed into a closed position to clamp the buffer portion of the second fiber. Clamping of the fibers restricts the ability of the fiber to rotate, thereby reducing the likelihood of torsional strains and stresses placed on the spliced fibers.

Figure 6:
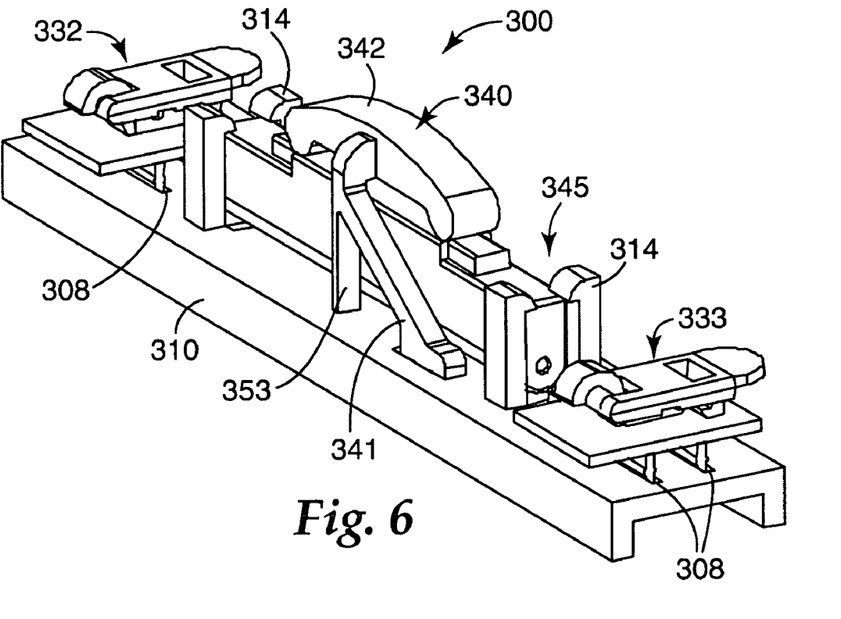
FIG. 6 shows an isometric view of a splice holder device according to another embodiment of the present invention.

FIG. 6 shows another embodiment, a splice holder device 300. Details of the features of this embodiment are further illustrated in FIGS. 7-9. As with the other embodiments, splice holder device 300 includes a tray or platform 310 that is installable in a telecommunications terminal or enclosure and that is configured to secure a splice 345, similar to that described above. Retaining arms 314 are also similar to those like elements described above. Further, splice holder device 300 can include a splice actuator mechanism 340, which includes a splice actuator lever 341, a splice cap driver 342, and a pre-actuation safety column 353, similar to those elements described above. In addition, splice holder device 300 can include fiber clamps 332 and 333. In this embodiment, fiber clamps 332 and 333 are configured as buffer clamping platforms that can be press fit into slots 308 formed in tray 310.

Figure 7:
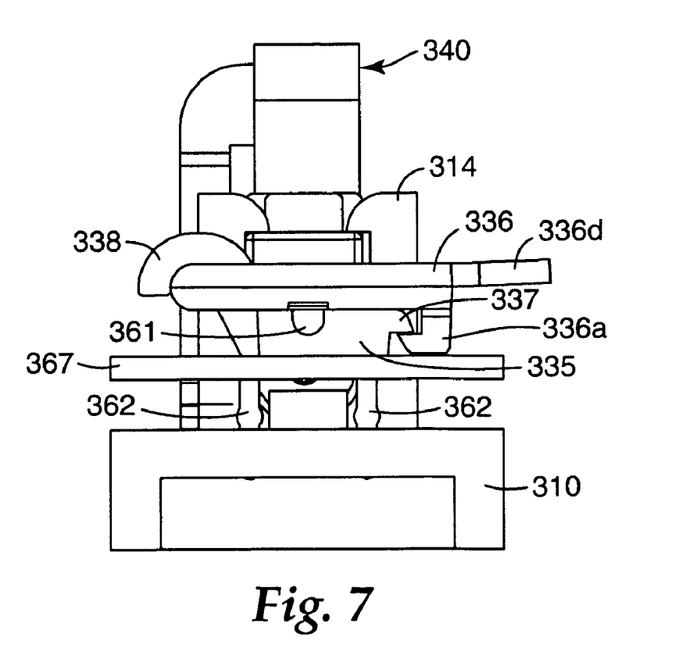
FIG. 7 shows an end view of the splice holder device of FIG. 6.
Figure 8:
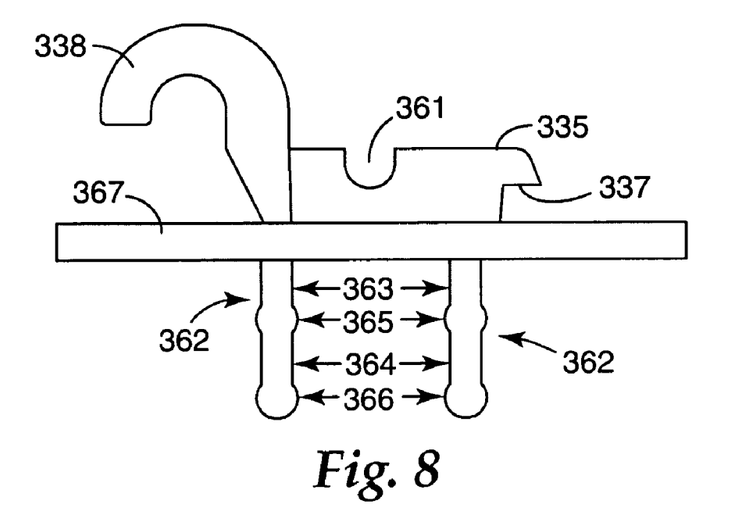
FIG. 8 shows an end view of the fiber clamp platform base of the splice holder device of FIG. 6.

As shown in FIGS. 7 and 8, fiber clamping platforms 332, 333 include a base 335 and a clamping plate 336. Base 335 includes a base arm, member or hook 338 that can engage with a rod portion of the clamp plate 336. In addition, clamp plate 336 can include a detent portion 336d, which provides a leverage point for a technician to open or engage the clamp plate to the base 335. In a closed position, a latch portion 336a of clamp plate 336 engages a latch portion 337 of base 335.

In addition, base 335 can include a fiber support channel/groove 361 that is configured to receive a particular fiber outer diameter. In addition, base 335 includes one or more platform legs or members 362 that extend from a base platform portion 367 and that are configured to engage one or more slots 308 of tray 310. In addition, legs 362 can be designed to position the platform base 335 at one or more different heights. As shown in FIG. 7, the platform is in an up or raised position. To accomplish a change of position, legs 362 can be designed to include thicker portions 364 and thinner portions 363 separated by one or more bulge portions 365 and 366 that can engage the sides of slots 308. Thus, by application of a modest downward force upon, e.g., base platform portion 367, the height of the fiber clamp 332, 333 can be changed with respect to the tray.

In practice, the thickness of leg portions 364 closely matches the width of slots 308, such that the platform cannot be axially displaced without the application of a modest force. In the down position, the leg material 363 is thinner than the slot, and this thickness difference allows the platform to move axially in the slots 308 within the holder tray 310.

Figure 9:
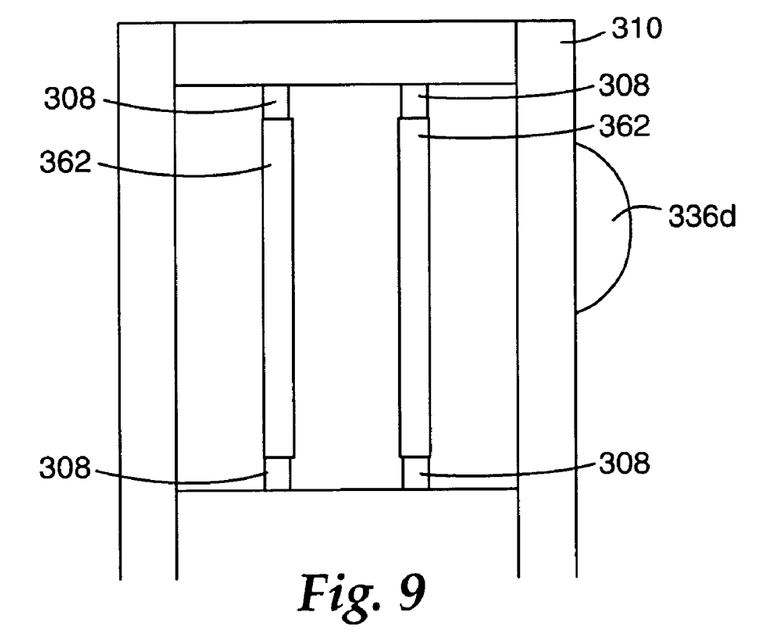
FIG. 9 shows a bottom view of a portion of the splice holder device of FIG. 6.

FIG. 9 shows a bottom view of tray 310, where the axial length of slots 308 is longer than the axial length of legs 362 of the platform, thus providing axial movement capability to the fiber clamp platform by a distance x (in either direction). This feature can counteract thermal expansion effects of the different materials used in the splice, as it allows the buffer clamp that is located on the platform to move independent of the splice. Thus, any movement that may occur during extreme temperature change, which could cause microbending of the fibers and result in increased power loss, can be compensated.

Thus, in practice, a fiber splicing sequence using splice holder 300 can take place as follows. Fibers are stripped, cleaned, cleaved, or otherwise prepared for splicing. The splice device can be placed in the holder tray. A first fiber can be guided through the fiber clamp and inserted into a first entrance port of the splice device. The stripped fiber is fed through the splice device until the non-stripped portion of the fiber is prevented from further axial movement by the decreasing fiber guide portions of the splicing device. The second fiber is then inserted through the other side of the splice holder and splice until the terminal end of the second fiber meets the terminal end of the first fiber. The splice can be actuated through the use of actuation mechanism 340. The first and second fiber clamps can be placed into closed positions to clamp the buffer portions of the fibers. Before or after the fiber clamps are closed, the platforms can be placed in the down position, to allow axial movement of the platform thereafter.

Figure 10:
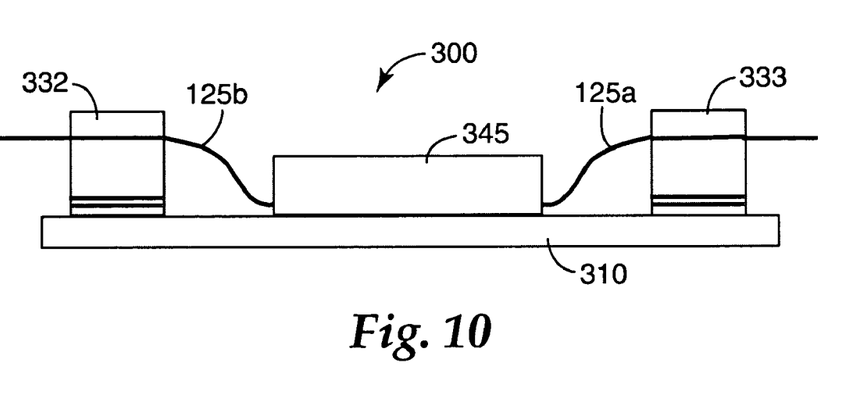
FIG. 10 shows a side schematic view of a splice holder device according to another embodiment of the present invention.

In another embodiment, shown in FIG. 10, fiber clamping platforms 332 and 333 are positioned in an up position. In this configuration, the portions of fibers 125a and 125b that are mounted in the fiber clamps are not aligned with the axial centerline of the splice. In this embodiment, the clamping platforms, e.g. legs 362, are configured such that the platforms are not free to move axially in either the upper or lower position. As shown in FIG. 10, the clamping platforms are raised to the upper position causing a bow to occur in the fibers 125a and 125b. In the lower position, there would be no bow in the fiber. This fiber bow can allow thermal expansion movement of the different materials to occur, thereby changing the radii of the fibers already in a bow shape, thus reducing the likelihood of micro-bending of the fiber.

In an alternative aspect, one or more of fiber clamping platforms 332 and 333 are provided in a fixed (non-moveable), but offset (horizontally) position. This alternative configuration reduces the amount of moving parts, and can still provide for a natural fiber bow that allows some compliance for movement of clamp relative to the holder, without causing high fiber stresses.

Figure 11:
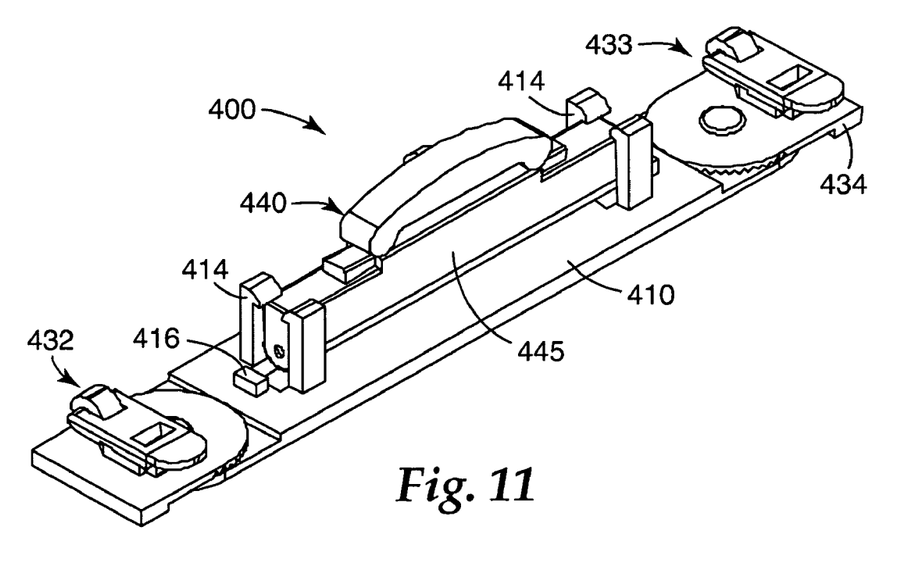
FIG. 11 shows an isometric view a splice holder device according to another embodiment of the present invention.
Figure 12:
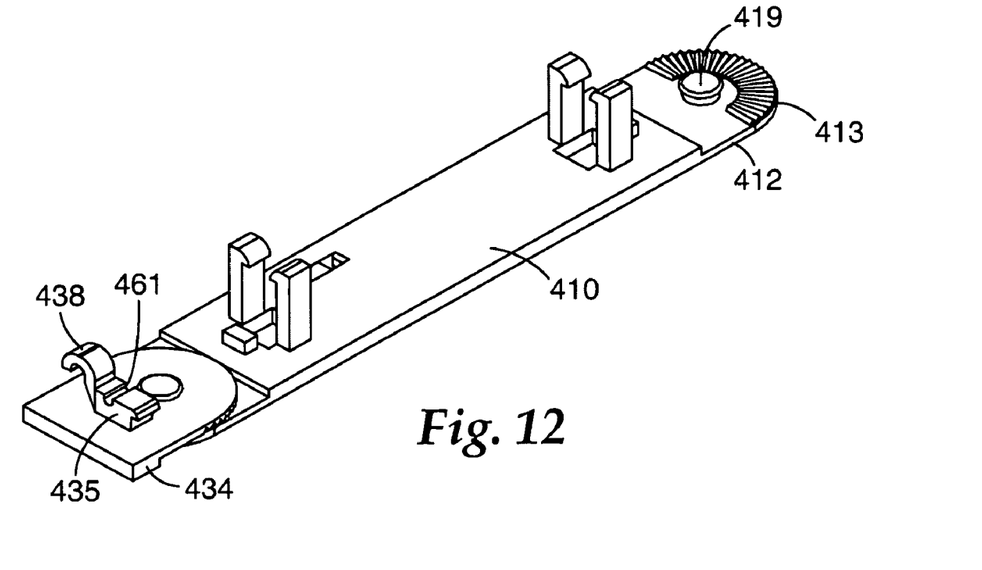
FIG. 12 shows an isometric view of the tray of the splice holder device of FIG. 11.
Figure 13:
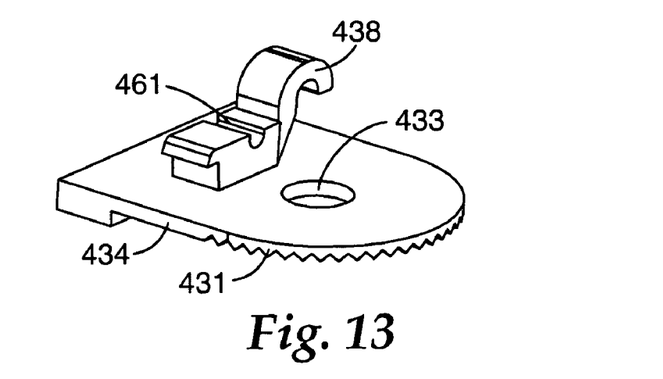
FIG. 13 shows an isometric view of the fiber clamp platform of the splice holder device of FIG. 11.

FIGS. 11-13 show yet another embodiment, a splice holder device 400. In this embodiment, a tray or platform 410 supports a splice 445 secured by a splice mounting mechanism, such as retaining structures 414 and (optionally) positional stops 416. A splice actuation mechanism 440, similar to the splice actuation mechanisms described above, can also be provided.

Splice holder device 400 further includes fiber clamps 432, 433 to minimize and/or prevent torsion stresses on the fiber. In this embodiment, fiber clamps 432, 433 are configured to have the ability to rotate. In some environments, especially tight spaces, fibers may need to be routed at different angles extending from the splice device. Thus, splice holder device 400 can provide flexibility for determining the final location of splice holder.

In this exemplary embodiment, fiber clamps 432, 433 include a rotatable platform 434 that engages with a boss 419, preferably a cylindrical boss, that can be formed as part of an end extension portion 412 of tray 410. In an exemplary aspect, the top portion of the boss 419 can have a larger diameter than the cylinder below for the purpose of retaining the clamp platform 434 onto the holder 400, such as by engaging with a hole 433 formed in platform 434. The clamp platform 434 can further include a clamp base 435, having a retaining hook 438 (for engaging with a clamping plate, similar to that described above with respect to FIGS. 2-4), and a fiber support channel or groove 461.

The clamp platforms of this embodiment are configured to have the ability to rotate by some angle (about the pivot boss 419), such as about 180° or less (i.e., about 90° left or right from an axially aligned position). This rotational capability can also provide the ability to put a controllable 90° bend in the fiber that may offset thermal expansion effects of the splice holder assembly. In addition, the clamp platforms can be designed to rotate such that the distance from the clamped fiber buffer to the spliced portion of the fiber does not change during rotation.

In an alternative aspect, one or more of fiber clamps 432 and 433 are provided in a fixed (non-moveable), but offset (by e.g., a 90° bend, a 45° bend, or another angle) position. This alternative configuration reduces the amount of moving parts, and can still provide for a natural fiber bow that allows some compliance for movement of clamp relative to the holder, without causing high fiber stresses.

For example, FIG. 12 is an illustration of the holder tray 410 with one clamping platform removed allowing a clear view of the boss 419. In this exemplary aspect, a series of V-shaped teeth or ribs 413 can be formed in tray extension 412 in a radial pattern around the boss 419 that provide detents. These detents can help ensure that the position of the platform 434 remains in the position that is selected by the person installing the holder 400. As shown in FIG. 13, clamp platform 434 can also include a corresponding series of matching raised teeth or ribs 431 in a radial pattern that can engage teeth or ribs 413. Thus, an installer can actuate the fiber clamp then select a particular fiber entrance/output angle and rotate the fiber clamp platform prior to final installation of the splice holder within an enclosure or other location. The engaging teeth can be formed such that the platform can be rotated with a modest application of force, but will otherwise stay in a set position.

Figure 14A:
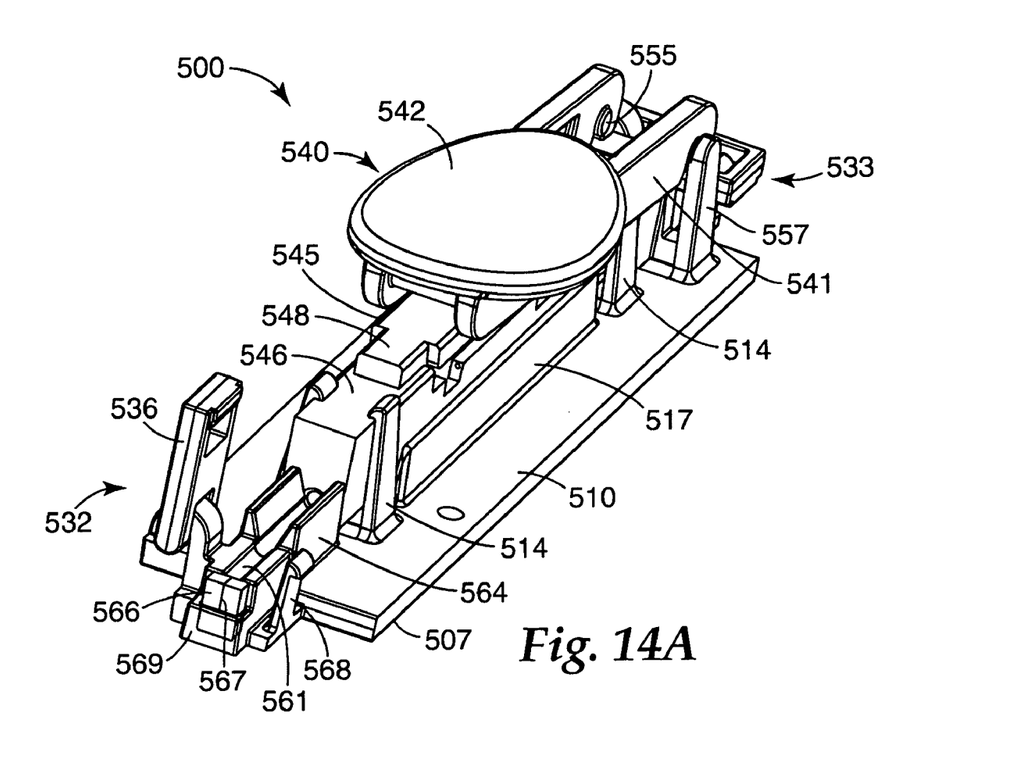
FIG. 14A shows an isometric view of a splice holder device according to yet another embodiment of the present invention.
Figure 14B:
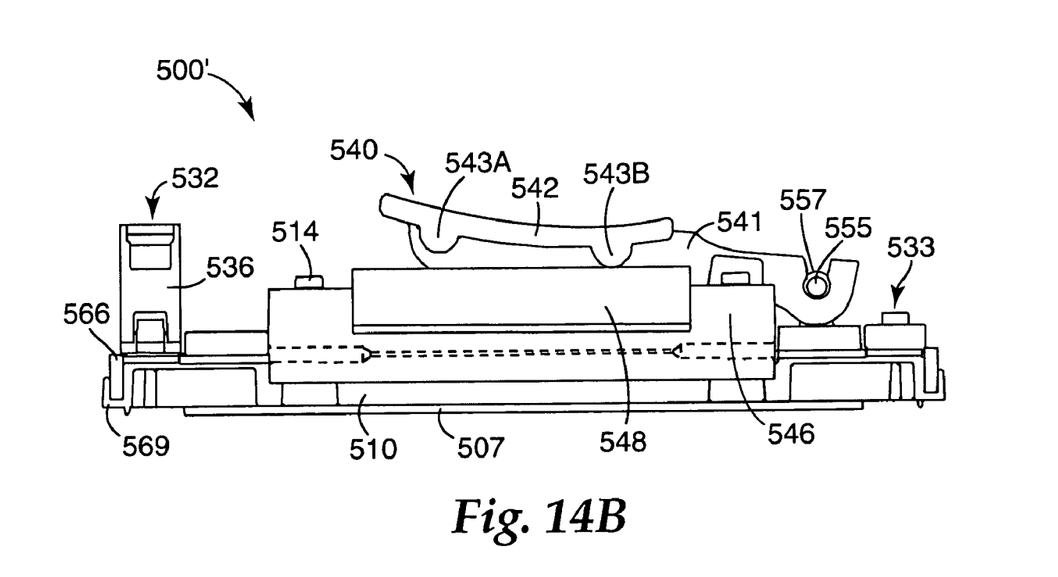
FIG. 14B shows a side view of a splice holder device according to yet another embodiment of the present invention.
Figure 15:
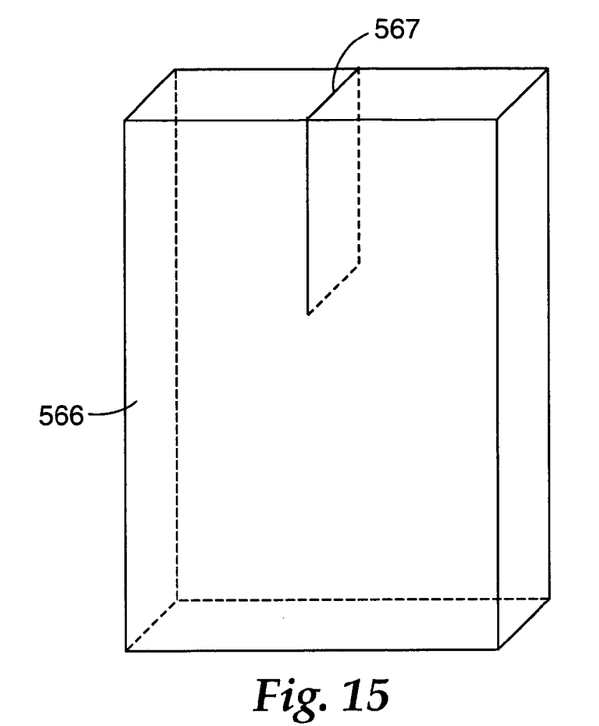
FIG. 15 shows an isometric view of an exemplary fiber support block.
Figure 16:
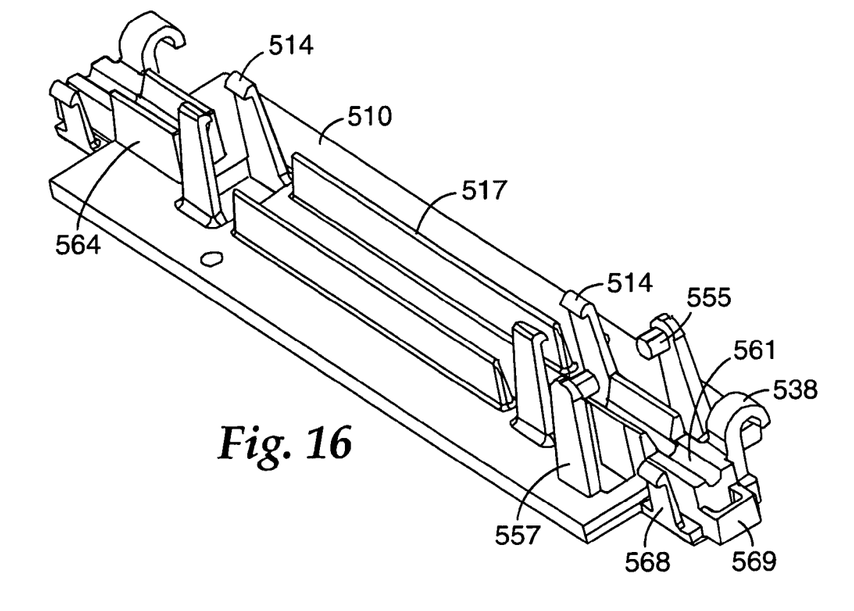
FIG. 16 shows an isometric view of the splice holder tray of FIG. 14A.

Another exemplary embodiment of a splice holder device is shown in FIG. 14A, splice holder device 500. A side view of another splice holder device 500' is shown in FIG. 14B. Further details of the features of these embodiments are also illustrated in FIGS. 15 and 16. As with the other embodiments, splice holder device 500/500' includes a tray or platform 510 that is installable in a telecommunications terminal or enclosure, e.g., via an adhesive layer 507 (for example, a layer of VHB tape described above), and that is configured to secure a splice 545, similar to that described above. Retaining arms 514 are also similar to those like elements described above and can be utilized to secure splice device body 546 to maintain the axial and/or lateral position and/or height position of the splice device 545. As further shown in FIGS. 14A and 16, tray 510 can include one or more retainer walls 517 to further secure the position of the splice device 545.

Further, splice holder device 500 can include a splice actuator mechanism 540. In this exemplary embodiment, splice actuation mechanism 540 includes splice actuator lever arms 541, mounted to posts 557 formed on tray 510 via coupling mechanism 555, and a splice cap driver 542. For example, hook portions of arms 541 can be configured to couple to coupling rods 555 from above (see FIG. 14A) or below (see FIG. 14B). When splice device 545 is to be activated, the actuating cap 548 can engage the mechanical splice element therein through the application of a force against cap driver 542. Thus, through the application of a modest force (e.g., by an installer pressing the cap driver 542), the splice device 545 can be actuated to complete the splicing of fibers held in the mechanical splice element. In addition, driver 542 can be configured to spread the driving force across the surface area of cap 548, e.g., by engaging with contact points 543A and 543B of the bottom surface of cap driver 542 (see e.g., FIG. 14B).

In addition, splice holder device 500 can include fiber clamps 532 and 533. In this embodiment, fiber clamps 532 and 533 are configured as buffer clamping platforms that can be used to clamp one or more different sizes of fiber buffer coatings, such as, e.g., 900 µm and 250 µm buffer coated fibers. As would be apparent to one of skill in the art, fiber buffer coating sizes may vary from the identified examples.

For example, fiber clamps 532, 533 can each include a clamping plate 536. Each fiber clamp can include a base arm, member or hook 538 that can engage with the clamp plate 536. When closed, the clamp plate can be secured by engagement with a latch 568 formed in the tray 510.

In addition, fiber clamps 532, 533 can include a fiber support channel/groove 561 that is configured to receive a particular fiber outer diameter. In this exemplary embodiment, the fiber support channel/grooves 561 are configured to support 900 µm buffer coatings. Thus, when the clamp plate 536 is placed in a closed position, the buffer coating of the fiber is secured within fiber support channel/grooves 561 as the clamp plate contacts a portion of the 900 µm buffer coating.

For securing 250 µm buffer coated fibers, device 500 can include fiber support blocks 566 at one or both ends. Blocks 566 can be secured in place on tray 510 by being snug fit in cavities or wells 569, formed at one or both ends. Fiber support blocks 566 can be constructed from a material such as foam (e.g., PORON L-24, available from Rogers-INOAC Corp., Japan), which has sufficient stiffness, but some flexibility, to retain the fiber buffer coating. For example, a slit 567 can be formed in blocks 566 that can receive a 250 µm buffer coated fiber. Thus, when the clamp plate 536 is placed in a closed position, a portion of the clamp plate can contact the portion of the block 566 and slit 567 that has received the 250 µm buffer coated fiber. Thus, after splicing takes place, the first and second fiber clamps 532, 533 can be placed into closed positions to clamp the buffer portions of the fibers to restrict the ability of the fibers to rotate, thereby reducing the likelihood of torsional strains and stresses placed on the spliced fibers. For larger sized fiber buffer coatings (e.g., 900 µm buffer coatings), one or more of the fiber support blocks can be removed from the wells 569 of the device 500 so as to not interfere with the clamping process.

In addition, one or more fiber guides or grooves 564, formed in tray 510, can be provided to further assist in guiding, aligning and/or positioning the fibers being spliced.

Thus, utilizing the above approaches, optical fiber splices can be simplified by employing a closure/terminal that includes the above-described tray that is preloaded with the desired amount of splices. The installer can perform basic cable preparation, e.g., stripping the cable and cleaving the fiber in preparation to install the fiber into the splice device. In many of the illustrated aspects, after the fiber is prepared, the fiber is inserted into the splice and the splice can be actuated without the need for a separate splice tool. Alternatively, the fiber can be inserted into the back of the splice device, while that fiber is held in position with the fiber clamp.

In accordance with the present invention, the exemplary splice holder devices described above can be readily installed and utilized within conventional closures/terminals for FTTH and/or FTTX, network installations. An exemplary terminal or closure (also referred to as an enclosure) can be designed an appropriate rugged material to protect the splices supported within from damaging interference due to weather elements, dust, animals, and other elements. Further, the enclosure can be designed to permit re-entry by an installer. For example, the enclosure can be a conventional enclosure unit, such as SliC™ closure/terminal or 3M™ BPEO closure, available from 3M Company, St. Paul, Minn. For example, the enclosure can be designed in accordance with the structure described in commonly owned and co-pending U.S. application Ser. No. 10/916,332, incorporated by reference herein, in its entirety.

The devices of the present invention can be utilized in installation environments that require ease of use when handling multiple splices, especially where labor costs are more expensive.

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

What is claimed is:

1. A splice holder device, comprising:
  a tray mountable in a telecommunications closure, the tray including a splice mounting mechanism configured to receive a splice device; and
  first and second fiber clamps disposed on the tray, wherein the first and second fiber clamps are each configured to releasably secure a buffered portion of an optical fiber; wherein at least one of the first and second fiber clamps comprises a base portion having
  an alignment groove formed therein, said alignment groove configured to support a portion of the optical fiber disposed therein, and
  an engagement portion configured to rotatably engage a clamp plate.

2. The splice holder device of claim 1, wherein the tray includes a plurality of splice mounting mechanisms configured to receive a plurality of splice devices.

3. The splice holder device of claim 1, wherein the splice mounting mechanism includes a plurality of retaining arms to releasably secure the splice device.

4. The splice holder device of claim 3, wherein the plurality of retaining arms are integrally formed on a surface of the tray, wherein one or more of the retaining arms includes a latch engageable with a top surface of the splice device.

5. The splice holder device of claim 3, wherein the mounting mechanism further comprises one or more position stops configured to reduce an axial movement of the splice device secured in the splice mounting mechanism.

6. The splice holder device of claim 3, further comprising one or more fiber alignment structures integrally formed on a surface of the tray and disposed proximate to one or both of the first and second ends of the tray.

7. The splice holder device of claim 1, further comprising a splice actuation mechanism configured to actuate a splice device mounted in the splice mounting mechanism.

8. The splice holder device of claim 7, wherein the splice actuation mechanism is coupled to a receptacle formed in the tray and wherein the splice actuation mechanism comprises a lever removably coupled to the tray and a driver formed on an end of said lever and adapted to contact a portion of the splice device.

9. The splice holder device of claim 8, wherein the splice actuation mechanism further comprises a column coupled to the lever to resist a movement of the lever in at least one direction.

10. The splice holder device of claim 1, wherein the tray, splice mounting mechanism, and fiber clamps are integrally formed as a single piece of material.

11. The splice holder device of claim 1, wherein at least one of the base and the clamp plate comprises a latch to secure the fiber clamp in a closed position about an optical fiber disposed therein.

12. The splice holder device of claim 1, wherein at least one of the first and second fiber clamps is offset by at least one of height and angle with respect to a splice device received in the splice mounting mechanism.

13. A splice holder device, comprising:
a tray mountable in a telecommunications closure, the tray including a splice mounting mechanism configured to receive a splice device; and
first and second fiber clamps disposed on the tray, wherein the first and second fiber clamps are each configured to releasably secure a buffered portion of an optical fiber wherein at least one of the first and second fiber clamps comprises a base platform axially moveable on the tray and having an adjustable height with respect to the tray.

14. The splice holder device of claim 13, wherein the base platform includes one or more members extending therefrom and configured to be received in one or more slots formed in the tray, wherein a first portion of the one or more members has a first thickness and a second portion of the one or more members has a second thickness, wherein the first thickness is greater than the second thickness.

15. The splice holder device of claim 13, wherein the base platform includes:
an alignment groove formed therein, said alignment groove configured to support a portion of the optical fiber disposed therein, and
an engagement portion configured to rotatably engage a clamp plate.

16. A splice holder device, comprising:
a tray mountable in a telecommunications closure, the tray including a splice mounting mechanism configured to receive a splice device; and
first and second fiber clamps disposed on the tray, wherein the first and second fiber clamps are each configured to releasably secure a buffered portion of an optical fiber, wherein at least one of the first and second fiber clamps comprises a base rotatably engageable with a boss formed on a surface of the tray near one of the first and second ends.

17. The splice holder device of claim 16, wherein the base further comprises a first set of detents formed in a radial pattern and configured to engage a second set of detents formed on a surface of the tray near one of the first and second ends.

18. The splice holder device of claim 1, wherein the first fiber clamp comprises a fiber support block having a slit formed therein configured to retain the buffered portion of an optical fiber received therein.

19. The splice holder device of claim 6, wherein the splice actuation mechanism comprises one or more splice actuator lever arms mounted to posts formed on the tray and a splice cap driver configured to contact a portion of a splice device mounted in the splice mounting mechanism.

20. The splice holder device of claim 1 securedly mounted in a telecommunications enclosure.

21. The splice holder device claim 16, wherein the splice mounting mechanism includes a plurality of retaining arms to releasably secure the splice device.

22. The splice holder device of claim 21, wherein the plurality of retaining arms are integrally formed on a surface of the tray, wherein one or more of the retaining arms includes a latch engageable with a top surface of the splice device.

23. The splice holder device of claim 21, wherein the mounting mechanism further comprises one or more position stops configured to reduce an axial movement of the splice device secured in the splice mounting mechanism.

24. The splice holder device of claim 16, further comprising one or more fiber alignment structures integrally formed on a surface of the tray and disposed proximate to one or both of the first and second ends of the tray.

25. The splice holder device of claim 16 securedly mounted in a telecommunications enclosure.

26. The splice holder device of claim 13 securedly mounted in a telecommunications enclosure.

27. The splice holder device of claim 16, wherein at least one of the first and second fiber clamps comprises a base portion and a clamping plate portion separated by a living hinge.

* * * * *

UNITED STATES PATENT AND TRADEMARK OFFICE
CERTIFICATE OF CORRECTION

PATENT NO. : 7,333,709 B2 Page 1 of 1
APPLICATION NO. : 11/221527
DATED : February 19, 2008
INVENTOR(S) : James B. Carpenter It is certified that error appears in the above-identified patent and that said Letters Patent is hereby corrected as shown below:

Column 15,
Line 7, delete "fiber" and insert -- fiber, -- therefor.

Column 16,
Line 13, after "device" insert -- of --.

Signed and Sealed this

Eighth Day of July, 2008

JON W. DUDAS
*Director of the United States Patent and Trademark Office*